United States Patent [19]

Sekiguchi et al.

[11] Patent Number: 4,788,602
[45] Date of Patent: Nov. 29, 1988

[54] ROTARY HEAD TYPE RECORDING AND/OR REPRODUCING APPARATUS

[75] Inventors: Fukunori Sekiguchi; Yukihiro Maruyama; Masami Tsubaki; Kazuyoshi Ebata; Kentaro Odaka, all of Tokyo, Japan

[73] Assignee: Sony Corporation, Tokyo, Japan

[21] Appl. No.: 76,026

[22] Filed: Jul. 21, 1987

[30] Foreign Application Priority Data

Jul. 22, 1986 [JP] Japan .............................. 61-172562

[51] Int. Cl.$^4$ ..................... H04N 5/91; G11B 27/10
[52] U.S. Cl. ................................ 358/337; 360/14.3; 360/72.2
[58] Field of Search ................... 358/310, 335, 337; 360/13, 14.3, 72.2

[56] References Cited

U.S. PATENT DOCUMENTS 4,175,267 11/1979 Tachi ............................. 360/72.2
4,688,116 8/1987 Takahashi et al. ............... 360/72.2

Primary Examiner—L. T. Hix
Assistant Examiner—D. Rutledge
Attorney, Agent, or Firm—Philip M. Shaw, Jr.

[57] ABSTRACT

A rotary head type recording and/or reproducing apparatus is so arranged as to be able to record on and/or reproduce from a recording track on a recording medium a time code which is not synchronized with the revolution of a rotary head, whereby even when the revolution period of the rotary head is special, the edition of the recording medium can be made with high accuracy and a track exclusively required by the time code becomes unnecessary. Also, a surplus calculating circuit for calculating a surplus when a number is divided by a divisor is disclosed, in which the surplus can be obtained only by the addition without carrying out the division in practice. Accordingly, time necessary for such calculation can be reduced and the scale of circuit arrangement can be miniaturized.

11 Claims, 9 Drawing Sheets

| W1 | | | W2 | |
|---|---|---|---|---|
| Sub-code ID | | | Sub-code ID | Block Address |
| Control-ID | Data ID | 1 | Format ID | X X X 0 |
| PNO-ID(2) | PNO-ID(3) | 1 | PNO-ID(1) | X X X 1 |

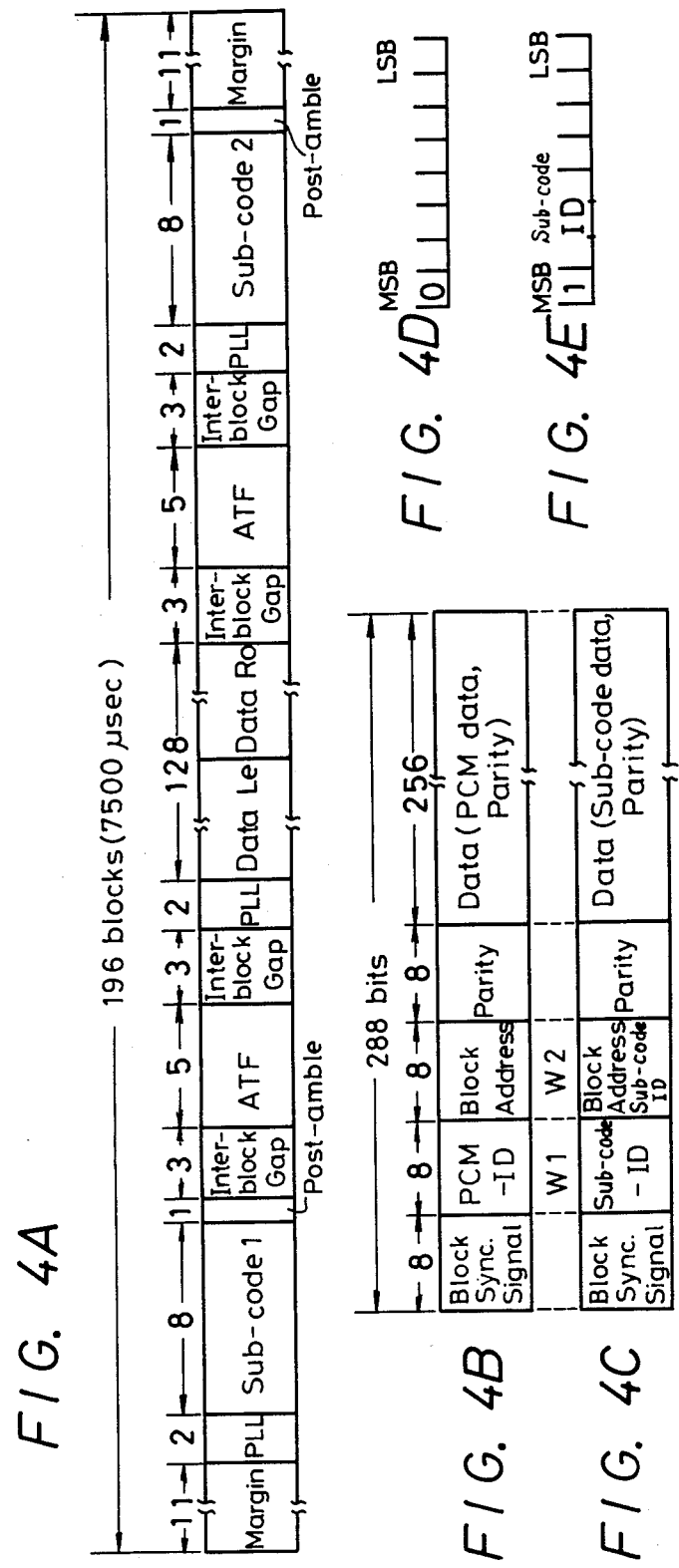

FIG. 6

| Name of Words | MSB            LSB |
|---|---|
| PC1 | Item |
| PC2 | |
| PC3 | |
| PC4 | |
| PC5 | |
| PC6 | |
| PC7 | |
| PC8 | Parity |

FIG. 7

| Name of Words | MSB | | | | | LSB |
|---|---|---|---|---|---|---|
| PC1 | 0 | 0 | 0 | 1 | 0 | PNO-1 |
| PC2 | PNO-2 | | | PNO-3 | | |
| PC3 | Index No. | | | | | |
| PC4 | Hour | | | | | |
| PC5 | Minute | | | | | |
| PC6 | Second | | | | | |
| PC7 | Frame | | | | | |
| PC8 | Parity | | | | | |

| Name of Words | MSB | | | | LSB |
|---|---|---|---|---|---|
| PC1 | Item | 0 | 0 | 0 | 0 |
| PC2 | Flag | | | | |
| PC3 | Bit Number | | | | |
| PC4 | Hour (8th, 7th binary groups) | | | | |
| PC5 | Minute (6th, 5rd binary groups) | | | | |
| PC6 | Second (4th, 3rd binary groups) | | | | |
| PC7 | Frame (2nd, 1st binary groups) | | | | |
| PC8 | Parity | | | | |

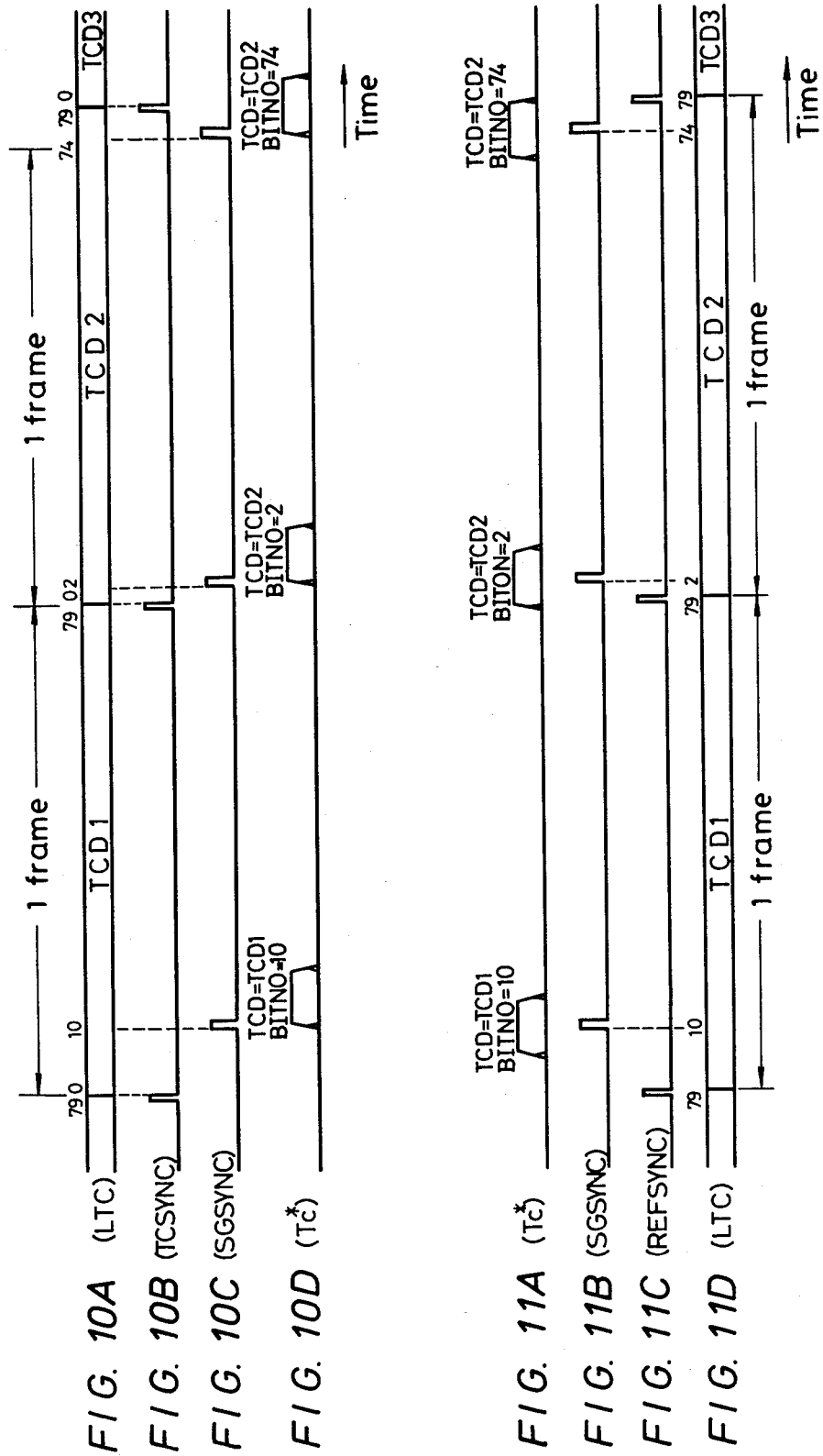

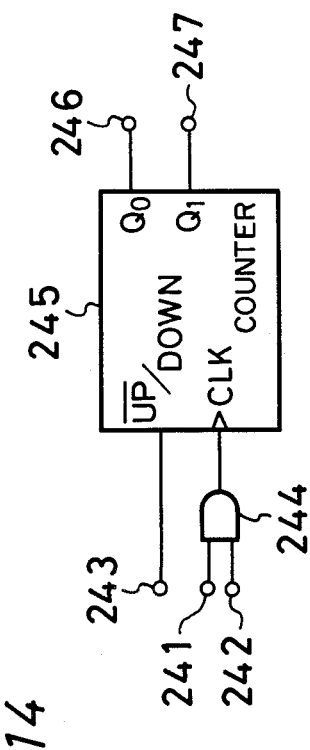
FIG. 14
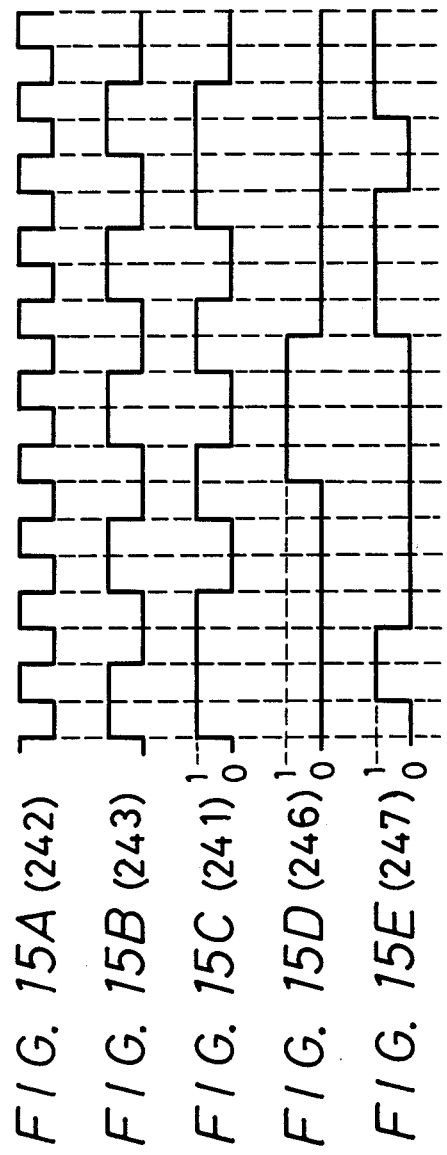
FIG. 15A (242)
FIG. 15B (243)
FIG. 15C (241)
FIG. 15D (246)
FIG. 15E (247)

ROTARY HEAD TYPE RECORDING AND/OR REPRODUCING APPARATUS

BACKGROUND OF THE INVENTION

1. Field of the Invention

The present invention relates generally to rotary head type recording and/or reproducing apparatus and more particularly to an apparatus for encoding a time code.

2. Description of the Prior Art

In a conventional rotary head type video tape recorder (VTR), a time code, for example, SMPTE time code is recorded on a magnetic tape in its longitudinal direction for convenience sake of edition. In this case, while the revolution number of a rotary head of a VTR is 30 r.p.s, the frequency of the SMPTE time code is 30 Hz so that the segment unit of data and the value of time code correspond to each other one-to-one relation.

FIG. 1 illustrates a format of the SMPTE time code. Referring to FIG. 1, in the SMPTE time code, one frame is formed of 80 bits (bit number is 0 to 79) and hence the bit frequency is 2.4 kHz. Of the 80 bits, 32 bits are assigned to the time code, further 32 bits are assigned to user vacant bits and the remaining 16 bits are assigned to a sync. word. Time code of 32 bits is formed of a frame code, a second code, a minute code and an hour code and indicates the second, minute, hour and the order of a frame. Each of the time codes is divided into 4 bits by 2 between adjacent ones of which the user bits of 4 bits each are inserted. The sync. word of 16 bits is used to check whether a magnetic tape is transported in the positive direction, or the SMPTE time code is read out in the direction shown by an arrow F or whether the magnetic tape is transported in the opposite direction, or the SMPTE time code is read out in the direction shown by an arrow R. Accordingly, regardless of the direction in which the magnetic tape is transported, the code signal can be read out correctly.

The code signal is a so-called bi-phase signal in which data "1" and "0" are represented by the difference between inverting phases, as shown in FIG. 1. In the illustrated example, time code indicates 29 frames, 59 seconds, 59 minutes and 23 hours.

By the way, a rotary head type digital audio tape recorder (hereinafter simply referred to as "R-DAT") is proposed, in which the revolution number of a rotary head is 100/3 sec. FIG. 2 illustrates an example of such R-DAT.

Referring to FIG. 2, there is shown a rotary drum 1 of which the diameter is 30 mm and which is rotated at 2000 r.p.m. A pair of magnetic heads 2A and 2B are mounted on the rotary drum 1 with an angular spacing of 180°, and a magnetic tape 3 is wrapped around the peripheral surface of the rotary drum 1 over a tape wrapping angle of 90°. The magnetic tape 3 is stretched between reel hubs 4A and 4B and transported at the speed of 8.15 mm/second by a capstan 5 and a pinch roller 6.

When the magnetic heads 2A and 2B slidably contact with the magnetic tape 3 alternately, slant tracks 7A and 7B are formed on the magnetic tape 3 as shown in FIG. 3. The tape width A of the magnetic tape 3 is selected to be 3.81 mm. The magnetic gap of one rotary head 2A is inclined by $+\alpha$ relative to the direction perpendicular to the track whereas the magnetic gap of the other rotary head 2B is inclined by $-\alpha$ relative to the direction perpendicular to the track. In this case, $\alpha$ is selected to be 20°. The angles of the magnetic gaps of the magnetic heads 2A and 2B are referred to as $+$azimuth and $-$azimuth, respectively.

Referring back to FIG. 2, the magnetic heads 2A and 2B are alternately selected by a head change-over switch 8, and a recording signal from a contact r of a recording/reproducing switch 9 is supplied through a rotary transformer (not shown) to the magnetic heads 2A and 2B. While, reproduced signals from the magnetic heads 2A and 2B are delivered through a rotary transformer (not shown) to a contact p of the recording-/reproducing switch 9.

An analog audio signal applied to an input terminal 10 is supplied through a low pass filter 11 to an analog-to-digital (A/D) converter 12, in which it is converted to a digital audio signal (at the sampling frequency of 48 kHz and the linear quantization of 16 bits). The digital audio signal from the A/D converter 12 is supplied to a recording signal processing circuit 13. In the recording signal processing circuit 13, the digital audio signal is added with an error correction code and is converted to a format of recording data which will be described later. In this case, an ID signal (PCM (pulse code madulated)-ID) to identify the on/off of pre-emphasis of a signal to be recorded, the sampling frequency and the bit number of quantization is added to the digital audio signal. A program number of the signal to be recorded, a sub-code such as a time code or the like and an ID signal for the sub-code (sub-code ID) are formed by a sub-code encoder (not shown) and then supplied through a terminal 14 to the recording signal processing circuit 13.

The recording signal processing circuit 13 generates serial recording data of one track amount in synchronism with the revolution of the magnetic heads 2A and 2B. The recording data is supplied through a recording amplifier 15 and the contact r of the recording/reproducing switch 9 to the head change-over switch 8. The change-over switch 8 permits the recording data to be supplied to the magnetic heads 2A and 2B, alternately.

The signal reproduced by the magnetic heads 2A and 2B is supplied through the head change-over switch 8 and the contact p of the recording/reproducing switch 9 to a playback amplifier 16. The output signal from the playback amplifier 16 is supplied to a PLL (phase-locked loop) circuit 17, in which a clock synchronized with the reproduced signal is extracted from the output signal of the playback amplifier 16. The reproduced signal from the PLL circuit 17 is supplied to a reproduced signal processing circuit 18, in which it is subjected to error correction, error interpolation and so on. A reproduced digital audio signal from the reproduced signal processing circuit 18 is supplied to a digital-to-analog (D/A) converter 19. A reproduced audio signal from the D/A converter 19 is delivered through a low pass filter 20 to an output terminal 21. At the same time, the sub-code and the sub-code ID are separated in the reproduced signal processing circuit 18 and then fed to an output terminal 22. To the output terminal 22, there is connected a sub-code decoder (not shown) in which control data and so on are formed from the sub-code.

A timing control circuit 23 is adapted to form control signals to control the head change-over switch 8 and the recording/reproducing change-over switch 9, respectively. The timing control circuit 23 also generates a clock signal and a timing signal necessary for both the recording signal processing circuit 13 and the reproduced signal processing circuit 18, respectively.

A format of data used in this R-DAT will now be described.

One segment assumes the whole of data to be recorded on one track. FIG. 4A illustrates a data format of one segment recorded by one rotary head. If the unit amount of recorded data is taken as one block, one segment contains data of 196 blocks (7500 μsec). Referring to FIG. 4A, margins (11 blocks) are assigned to one segment at its both end portions corresponding to both end portions of the track. Sub-code 1 and sub-code 2, each formed of 8 blocks, are recorded adjacent to the margins, respectively. Two sub-codes 1 and 2 are the same data, whereby the double recording is carried out. The sub-code indicates the program number and the time code. A PLL run-in interval (2 blocks) and a postamble interval (1 block) are assigned to both sides of the recording areas of 8 blocks in each of the sub-codes. Further, inter-block gaps (3 blocks) are provided, on which no data is recorded, and a pilot signal for ATF (automatic tracking follow) system is recorded on the recording areas of 5 blocks between the inter-block gaps. A PCM (pulse code modulated) signal which is subjected to the recording process is recorded on the recording area of 128 blocks within the central recording area of 130 blocks of one segment except for the PLL run-in interval of 2 blocks. This PCM signal is data corresponding to an audio signal of the period during which the rotary head is rotated one half.

This PCM signal is formed of 2-channel stereo PCM signal of L (left) channel and R (right) channel and parity data for error detection/error correction. When one segment shown in FIG. 4A is recorded and/or reproduced by the magnetic head 2A, data Le is recorded on the left-hand side half of the PCM signal recording and/or reproducing area, whereas data Ro is recorded on the right-hand side half thereof. Data Le is formed of even-numbered data of L channel and parity data for this data, whereas data Ro is formed of odd-numbered data of R channel and parity data for this data. The odd and even numbers are determined by counting the beginning of the interleaved block.

On the track formed by the second magnetic head 2B, there are recorded data of one segment which is same in format as that of the above one segment. Data Re is recorded on the left-hand side half of the data interval contained in data of one segment of the other track and data Lo is recorded on the right-hand side half thereof. Data Re is formed of even-numbered data of R channel and parity data therefor whereas data Lo is formed of odd-numbered data of L channel and parity data therefor. As described above, even-numbered data and odd-numbered data of respective channels are separately recorded on two adjacent tracks and data of L channel and R channel are recorded on the same track so that continuous data of the same channel can be prevented from becoming erroneous due to the drop-out or the like.

FIG. 4B illustrates data format of one block of PCM signal. As shown in FIG. 4B, a block synchronizing signal of 8 bits (one symbol) is assigned to the beginning of one block and a PCM-ID of 8 bits is assigned next to the block synchronizing signal. A block address of 8 bits is assigned next to the PCM-ID. 2 symbols (W1 and W2) of PCM-ID and block address are subjected to the error-correction coding by using a simple parity and then a parity of 8 bits is assigned next to the block address. As FIG. 4D shows, the block address is formed of 7 bits except the most significant bit (MSB) and identifies the PCM block by making the MSB "0".

FIG. 4C illustrates the data format of one block of the sub-code and which is arranged the same as the data format of the afore-mentioned PCM block. As illustrated in FIG. 4E, this symbol identifies itself as the sub-code block by making the MSB of the symbol W2 of the sub-code block "1". The lower 4 bits of the symbol W2 are assigned to the block address, and 8 bits of the symbol W1 and 3 bits of the symbol W2 except the MSB and block address constitute the sub-code ID. 2 symbols (W1 and W2) of the sub-code block are subjected to the error correction coding by using a simple parity and then a parity of 8 bits is added thereto.

2 symbols W1 and W2 of the sub-code block are constructed as shown in FIG. 5.

As illustrated in FIG. 5, the MSB of the symbol W2 is used to identify whether the block is the sub-code block or PCM block. When the block is the sub-code block, the MSB becomes "1" as shown in FIG. 5. The lower 4 bits of the symbol W2 are the block address and the content of the sub-code ID is different dependent on whether the least significant bit (LSB) thereof is "0" or "1". When the LSB of the block address is "0", the symbol W1 is formed of the control ID of 4 bits and data ID f 4 bits, whereas 3 bits except the MSB and the block address of the symbol W2 are assigned to the format ID.

When the LSB of the block address is "1", 3 bits except the symbol W1, the MSB and the block address in the symbol W2 indicate a program number. In this case, the program number is expressed by the binary-coded decimal (BCD) code of 3 digits, wherein PNO-ID (1) of 3 bits in the symbol W2 indicate the most significant digit, PNO-ID (2) of upper 4 bits in the symbol W1 indicate the intermediate digit and PNO-ID (3) of lower 4 bits in the symbol W1 indicate the least significant digit. The program number from "001" to "799" can be expressed. "000" indicates that no program number is recorded, while "0AA" indicates that the program number is invalid.

The sub-code block in which the LSB of block address is "0" and the sub-code block in which the LSB of block address is "1" are alternately recorded on each 4 blocks of 8 blocks in each sub-code area.

When the data ID is "0000", this means that a pack data exists in the sub-code area. At that time, the format ID indicates a pack application area. When the format ID is "000", this means the absence of pack data. FIG. 6 illustrates a pack format. As illustrated in FIG. 6, the pack format consists of item block of 4 bits, and data and parity block of 60 bits. In other words, the pack format is formed of 8 symbols of PC1 to PC8, in which upper 4 bits of symbol PC1 are assigned to item block, symbol PC8 is assigned to parity block and others are assigned to data block. The item block of 4 bits indicates the mode of the content of the pack data. When the item block is, for example, "0001", the pack data indicates the program time mode, and the pack format of this program time mode is illustrated in FIG. 7.

In the R-DAT as described hereinabove, it may be considered to record a time code such as the SMPTE time code for convenience sake of edition. However, while the frequency of data segment of the R-DAT is 100/3 Hz as described above, the frequency of the SMPTE time code is 30 Hz. Hence, there is then a defect that the value of data segment and the value of the time code are not coincident in one-to-one relation.

Further, since the data segment and the time code can be synchronized with each other at the unit of several seconds or several minutes, they can be corresponded by a correspondence table. However, the correspondence table of several minutes requires a memory of large capacity. Also, when the recorder is operated in synchronism with the time code, the response is delayed.

OBJECTS AND SUMMARY OF THE INVENTION

Accordingly, it is a general object of this invention to provide an improved rotary head type recording and/or reproducing apparatus.

It is an object of this invention to provide a rotary head type recording and/or reproducing apparatus in which a time code which is not synchronized with the revolution of a rotary head can be recorded on and/or reproduced from a recording track satisfactorily so that the edition can be carried out with high accuracy even in a recording and/or reproducing apparatus of which the rotary head is rotated at a special speed.

It is another object of this invention to provide a rotary head type recording and/or reproducing apparatus in which a track exclusively used by a time code becomes unnecessary.

It is still another object of this invention to provide a rotary head type recording and/or reproducing apparatus which is applied to a so-called R-DAT.

It is a further object of this invention to provide an improved surplus calculating circuit usable in the R-DAT.

It is a further object of this invention to provide a surplus calculating circuit which can calculate a surplus with ease without executing practical division.

It is a further object of this invention to provide a surplus calculating circuit which can miniaturize a scale of hardware.

It is still further object of this invention to provide a surplus calculating circuit which can obtain a calculated result in a short period of time.

It is yet further object of this invention to provide a surplus calculating circuit suitable for use with a rotary head type recording and/or reproducing apparatus using a time code.

According to first aspect of the present invention, there is provided an apparatus for encoding time code comprising:
time code signal input terminal means for receiving a first time code signal including first time code data having a first synchronizing signal and time code series and comprised of a plurality of bits;
time code decoding means for decoding said first time code signal and generating second time code data;
synchronizing signal input terminal means for receiving a second synchronizing signal;
bit number data generating means for generating bit number data corresponding to the number of said plurality of bits of said first time code data in response to said second synchronizing signal; and
time code data output terminal means for deriving a second time code signal comprising said second time code data and said bit number data.

According to second aspect of the present invention, there is provided an apparatus for recording digital data including time code comprising:
time code signal input terminal means for receiving a first time code signal including first time code data having a first synchronizing signal and time code series and comprised of a plurality of bits;
time code decoding means for decoding said first time code signal and generating second time code data;
synchronizing signal input terminal means for receiving a second synchronizing signal;
bit number data generating means for generating bit number data corresponding to the number of said plurality of bits of said first time code data in response to said second synchronizing signal; and
means for recording said digital data including said second time code data and said bit number data to a recording medium in synchronism with said second synchronizing signal.

According to third aspect of the present invention, there is provided an apparatus for encoding time code comprising:
synchronizing signal input terminal means for receiving a first synchronizing signal;
time code data input terminal means for receiving said time code data;
bit number data input terminal means for receiving said bit number data;
bit clock input terminal means for receiving a bit clock signal corresponding to a bit period of bits of a time code of a first time code signal including first time code data having a second synchronizing signal and time code series and comprised of a plurality of bits;
said counter means loaded with said bit number data in response to said second synchronizing signal and for counting said second bit clock signal until a carry signal is generated;
time code encoding means connected to receive said time code data and for generating said first kind of time code series in response to said carry signal from said counter means; and
time code signal output terminal means for deriving a first time code signal including first time code data having a second synchronizing signal and time code series and comprised of a plurality of bits.

According to fourth aspect of the present invention, there is provided an apparatus for reproducing digital data including time code comprising: synchronizing signal input terminal means for receiving a first synchronizing signal; means for reproducing said digital data including time code data and bit number data from a recording medium in synchronism with said first synchronizing signal; bit clock input terminal means for receiving a bit clock signal corresponding to a bit period of bits of a time code of a first time code signal including first time code data having a second synchronizing signal and time code series and comprised of a plurality of bits; said counter means loaded with said bit number data in response to said second synchronizing signal and for counting said second bit clock signal until a carry signal is generated; time code encoding means connected to receive said time code data and for generating said first kind of time code series in response to said carry signal from said counter means; and time code signal output terminal means for deriving a first time code signal including first time code data having a second synchronizing signal and time code series and comprised of a plurality of bits.

According to fifth aspect of the present invention, there is provided an apparatus for recording and/or reproducing digital data including time code comprising:

time code signal input terminal means for receiving a first kind of time code signal including a time code synchronizing signal and a first kind of time code series each code having a plurality of bits;

time code decoding means for decoding each of said time code of said first kind of time code series and generating a control signal corresponding to said time code synchronizing signal, time code data, and a first clock signal corresponding to a bit period of bits of said time code;

time code data output terminal means for deriving said time code data;

counter means reset in response to said control signal from said time code decoding means and for counting said first clock signal corresponding to the number of said plurality of bits;

synchronizing signal input terminal means for receiving a second synchronizing signal;

latch means connected to receive said second synchronizing signal and for latching a content of said counter means in response to said second synchronizing signal so as to generate bit number data;

bit number data output terminal means for deriving said bit number data;

means for recording and/or reproducing said digital data including said time code data and bit number data to and/or from a recording medium in synchronism with said second synchronizing signal;

time code data input terminal means for receiving said time code data;

bit number data input terminal means for receiving said bit number data;

bit clock input terminal means for receiving a second bit clock signal;

said counter means loaded with said bit number data in response to said second synchronizing signal and for counting said second bit clock signal until a carry signal is generated; time code generating means connected to receive said time code data and for generating said first kind of time code series in response to said carry signal from said counter means; and time code signal output terminal means for deriving said first kind of time code series.

These and other objects, features and advantages of the present invention will become apparent from the following detailed description of the embodiments that are to be taken in conjunction with the accompanying drawings, throughout which like reference numerals identify like elements and parts.

BRIEF DESCRIPTION OF THE DRAWINGS

FIG. 4A is a track format of one segment;

FIG. 4B is a format of a PCM block in the segment shown in FIG. 4A;

FIG. 4C is a format of a sub-code block in the segment shown in FIG. 4A;

FIG. 4D is a format of a symbol in the PCM block;

FIG. 4E is a format of a symbol in the sub-code block;

FIG. 6 is a diagram showing a pack format;

FIG. 7 is a diagram showing a pact format of the program time mode;

FIGS. 10A to 10D are respectively timing charts used to explain the operation of the apparatus shown in FIG. 8 upon recording;

FIGS. 11A to 11D are respectively timing charts used to explain the operation of the apparatus shown in FIG. 8 upon reproducing;

FIG. 14 is a block diagram of a further embodiment of the surplus calculating circuit according to the present invention; and FIGS. 15A to 15E are respectively timing charts used to explain a further embodiment of the present invention shown in FIG. 14.

DESCRIPTION OF THE PREFERRED EMBODIMENTS

Figures 8, 9:
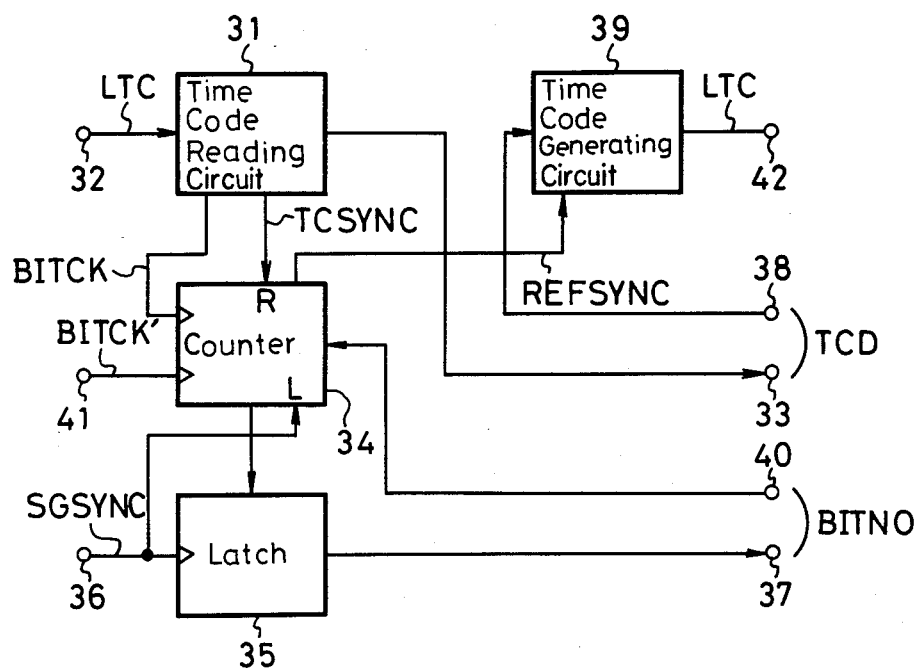
FIG. 8 is a block diagram showing a main portion of an embodiment of the rotary head type recording and/or reproducing apparatus according to the invention.
FIG. 9 is a diagram showing a pack format of the invention.

The present invention will now be described with reference to the drawings. FIG. 8 illustrates a main part of an embodiment of an R-DAT according to the present invention.

Figure 1:
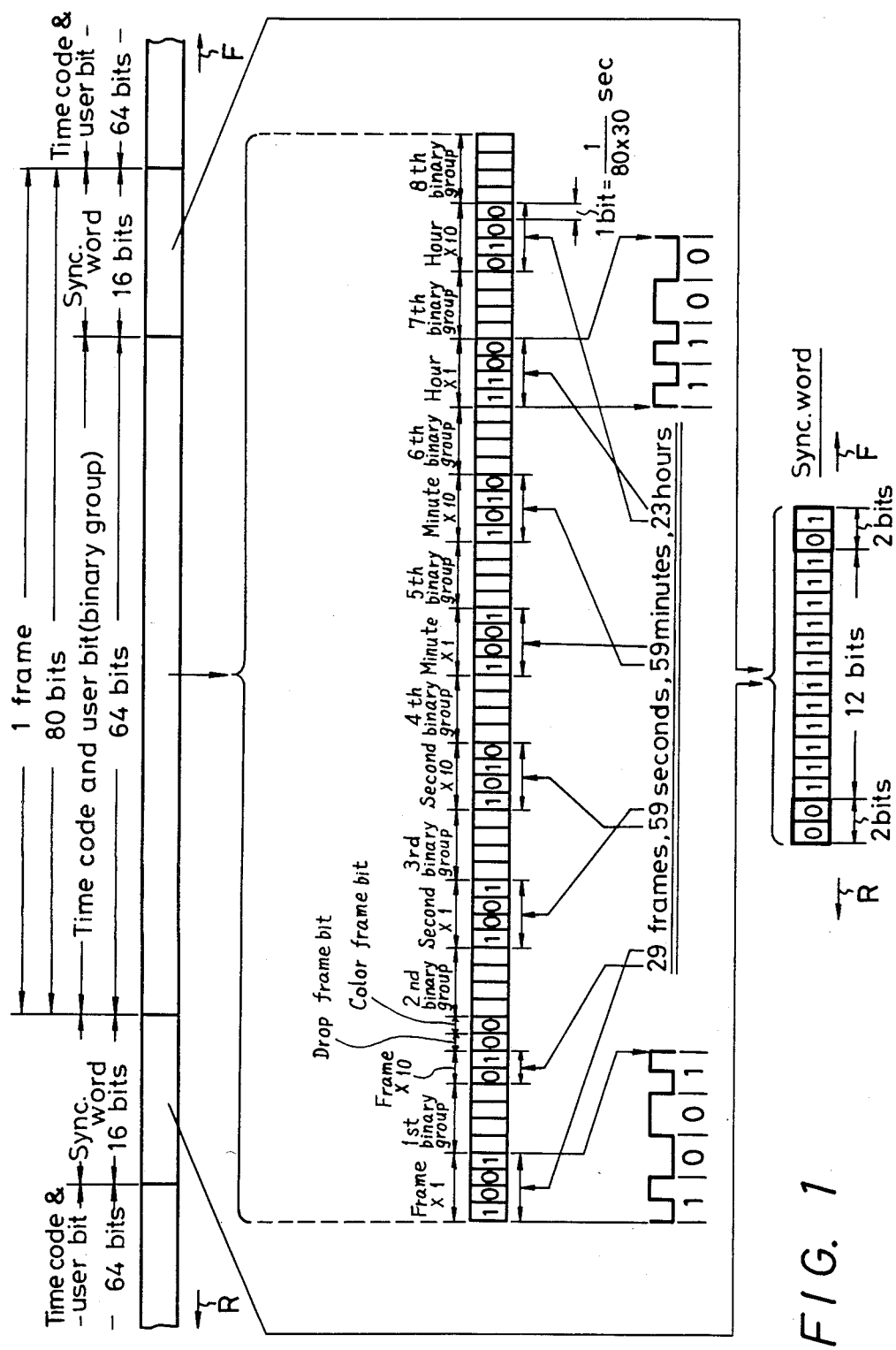
FIG. 1 is a format of an SMPTE time code.
Figure 2:
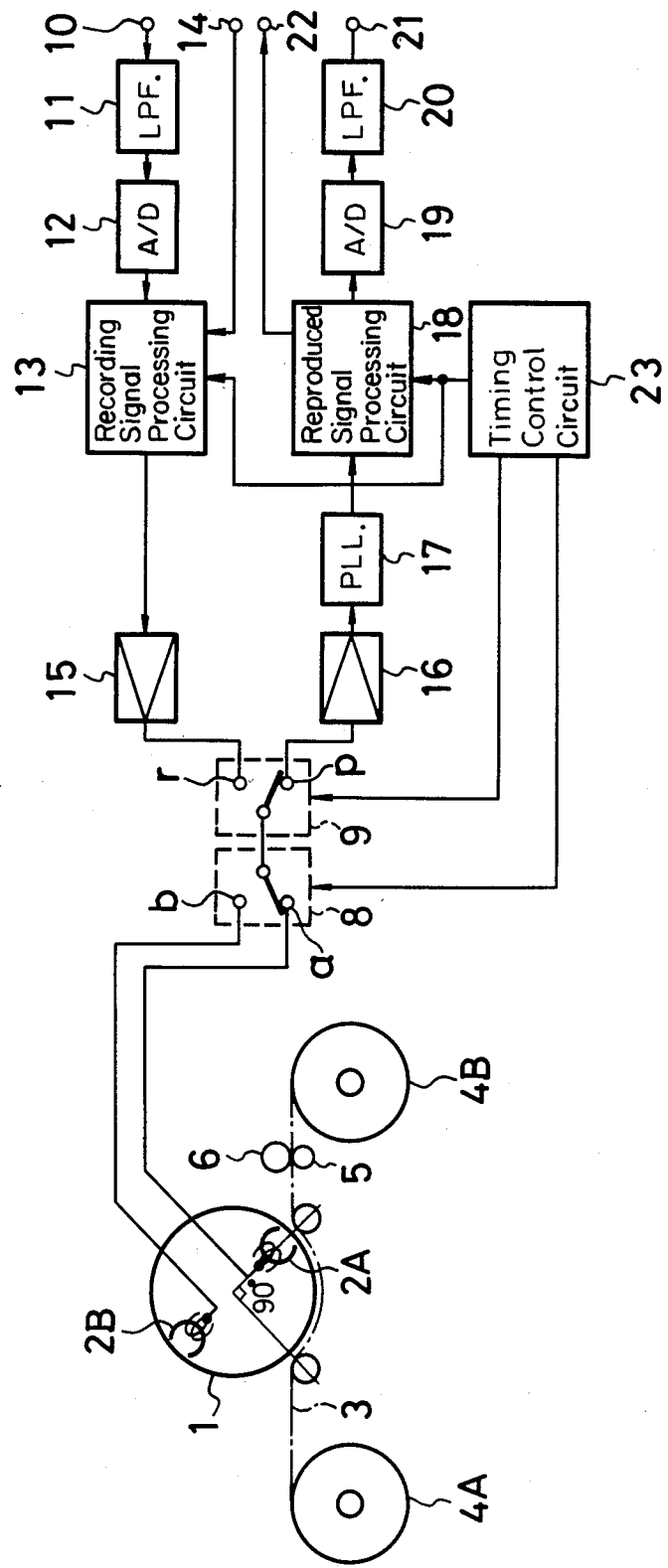
FIG. 2 is a block diagram showing a prior art rotary head type recording and/or reproducing apparatus to which the present invention is applied.
Figures 3, 5:
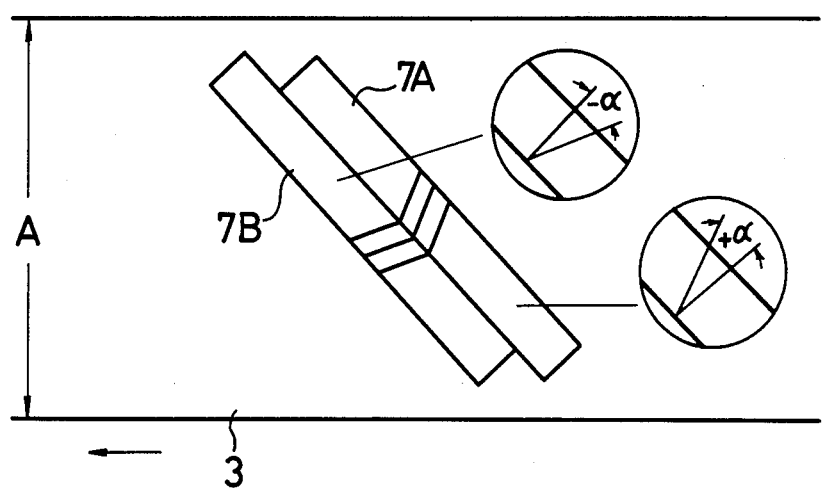
FIG. 3 is a format of a tape used by the rotary head type recording and/or reproducing apparatus shown in FIG. 2.
FIG. 5 is a diagram showing a format of the sub-codes.

Referring to FIG. 8, there is shown a time code reading circuit 31 which receives an SMPTE time code LTC from a terminal 32 when the R-DAT is placed in the recording mode. Time code data TCD such as "hour code", "minute code", "second code", "frame code" and so on generated from the time code reading circuit 31 is supplied to a terminal 33. From this terminal 33, time code data TCD is supplied to a sub-code encoder (connected to the terminal 14 (FIG. 2) though not shown) of the R-DAT.

There is provided a counter 34 which receives a time code synchronizing signal TCSYNC from the time code reading circuit 31 at one frame period (30 Hz) as a reset signal upon recording. Upon recording, 80 bit clocks BITCK per frame are generated from the time code reading circuit 31 and then fed to a clock input terminal of the counter 34.

Further, there is provided a latch circuit 35, and this latch circuit 35 receives an output from the counter 34. A segment synchronizing signal SGSYNC of 100/3 Hz synchronized with the revolution of the rotary heads 2A and 2B (FIG. 2) of the R-DAT is supplied to a terminal 36. This segment synchronizing signal SGSYNC is formed by dividing, for example, a master clock of the R-DAT. The segment synchronizing signal SGSYNC is supplied from the terminal 36 to the clock terminal of the latch circuit 35.

The output signal from the latch circuit 35 is supplied to a terminal 37, and from this terminal 37, this output signal is supplied to the sub-code encoder (not shown) of the R-DAT as bit number data BITNO.

A time code TC* including, for example, "hour code", "minute code", "second code", "frame code", "bit number" and so on is formed on the basis of the time code data TCD (added with one frame in practice)

from the time code reading circuit 31 and the bit number data BITNO from the latch circuit 35. This time code TC* is recorded on the sub-code data area of the afore-mentioned sub-code block as pack data. FIG. 9 illustrates the pack format thereof. The pack format is determined by an item which is not defined yet. In FIG. 9, a flag indicates various bit informations (drop frame flag, color flag, etc.) that the time code LTC has. The bit number is written in the symbol PC3. If two kinds of items are used, a user bit (binary group) of the time code LTC can be recorded. Accordingly, 80-bit information of time code LTC can all be recorded and reproduced.

To a terminal 38, there is supplied a time code data TCD which is obtained from a sub-code decoder (connected to the terminal 22 though not shown in FIG. 2) of the R-DAT upon reproducing. This time code data TCD from the terminal 38 is supplied to a time code generating circuit 39. At the same time, the bit number data BITNO from the sub-code decoder is applied to a terminal 40 and then fed to the counter 34.

The segment synchronizing signal SGSYNC applied to the terminal 36 is also fed to a load terminal L of the counter 34. Then, the bit number data BITNO is set in the counter 34 at this timing.

To a terminal 41, there are supplied 80 bit clocks BITCK' per frame when the R-DAT is set in the reproducing mode. The bit clock BITCK' is formed by dividing, for example, the master clock of the R-DAT. This bit clock BITCK' from the terminal 41 is supplied to the clock input terminal of the counter 34. In this case, the counter 34 is carry pulse when the count value thereof is changed from 79 to 0. This carry pulse is supplied to the time code generating circuit 39 as a reference synchronizing signal REFSYNC.

The time code generating circuit 39 generates an SMPTE time code LTC based on the time code data TCD (being added with one frame in practice) supplied from the terminal 38 at the timing of the reference synchronizing signal REFSYNC. This SMPTE time code LTC is delivered to a terminal 42.

When the R-DAT is placed in the recording mode, the SMPTE time code LTC is supplied to the terminal 32 at the timing shown in FIG. 10A. In FIG. 10A, references TCD1, TCD2, ..., designate time code data of respective frames and 0 to 79 designate bit numbers.

In this case, the time code synchronizing signal TCSYNC is supplied from the time code reading circuit 31 to the reset terminal R of the counter 34 in response to the end of each frame, or the sync word of time code LTC, as shown in FIG. 10B. Accordingly, the count value of the counter 34 is changed in coincidence with the bit number of the time code LTC.

Under this state, if the segment synchronizing signal SGSYNC is supplied to the terminal 36 at timing shown in FIG. 10C, the count value of the counter 34 is sequentially latched by the latch circuit 35 at the same timing.

Then, the sub-code encoder of the R-DAT generates the time code TC* on the basis of the time code data TCD supplied from the time code reading circuit 31 and the bit number data BITNO supplied from the latch circuit 35. This time code TC* is recorded on the sub-code data area of the sub-code as pack data (see FIG. 9) at timing shown in FIG. 10D.

When the R-DAT is placed in the reproducing mode, the time code TC* is reproduced by the R-DAT at timing shown in FIG. 11A. Then, the sub-code decoder generates the time code data TCD and the bit number data BITNO corresponding to the time code TC* which are then fed to the terminals 38 and 40, respectively.

Under this state, if the segment synchronizing signal SGSYNC is supplied to the terminal 36 at timing shown in FIG. 11B, the count value of the counter 34 is set equal to the bit number data BITNO and so on at the same timing. As a result, the carry pulse is generated from the counter 34 as shown in FIG. 11C and then fed to the time code generating circuit 39 as the reference synchronizing signal REFSYNC.

Accordingly, the time code generating circuit 39 generates the SMPTE time code LTC at timing shown in FIG. 11D.

According to this embodiment, as described above, the timing relationship between the time code LTD and the segment synchronizing signal SGSYNC (see FIGS. 10A and 10C) supplied upon recording becomes equal to the timing relationship between the time code LTC and the segment synchronizing signal SGSYNC (see FIGS. 11B and 11D) generated upon reproducing. Therefore, according to this embodiment, since the time code which is not synchronized with the revolution of the rotary head can be recorded on and reproduced from the recording track, even when the revolution of the rotary head is made quite special, the edition can be made with high accuracy and a track exclusively used by the time code becomes unnecessary.

While the SMPTE time code is explained as the example of the time code recorded in the longitudinal direction of the magnetic tape, other time codes can be employed similarly in this invention.

While the present invention is applied to the R-DAT as described above, the present invention can also be applied to other recording and/or reproducing apparatus similarly. In other words, the present invention is particularly suitable for use with a recording and/or reproducing apparatus using the time code which is not synchronized with the revolution of the rotary head.

An embodiment of a surplus calculating circuit according to the present invention, which can be employed in the R-DAT, will be described in detail hereinafter.

To make better understanding of this embodiment of the surplus calculating circuit, the principle of this surplus calculating circuit will be first explained mathematically. Respective symbols used herein will be defined as follows.

m assumes a natural number given as divisor; $\alpha$ assumes a binary number given as a number to be dividend; $P_i$ assumes a binary number having n digits resulting from dividing $\alpha$; and I assumes an integer (natural number) determined in response to $\alpha$ and n. Then, the binary number $\alpha$ given as a number to be divided will be expressed as $$= 2^n 2^n ( \ldots (2^n P_1 + P_2) + P_3) \ldots + P_I) \ldots ) + P_1 \qquad (1)$$

If the number $\alpha$ to be dividend $\alpha$ having, for example, 12 digits, that is, $\alpha = 010110101101$ is given, when $n = 3$ and $I = 4$ are satisfied, the binary number $\alpha$ can be expressed as $$P_1 = 101, P_2 = 110, P_3 = 101, P_4 = 101$$

-continued $$\alpha = 2^3(2^3(2^3P_1 + P_2) + P_3) + P_4$$
$$= 2^{(3+3+3)}P_1 + 2^{(3+3)}P_2 + 2^3P_3 + P_4$$

Between divisor m and dividend number α, the following relationship is established as will be expressed below $$\alpha = m + \sum_{i=1}^{I} S^{I-i} P_i \quad (2)$$

where $m = 2^n - S > 0$ and β is an integer determinable in response to α and m.

Let us prove the above Eq. (2) as follows. If Eq. (2) can be modified as $$\alpha = 2^n\{(2^n-S)\beta' + \gamma\}P_1 = 2^n\{m\beta' + \gamma\}P_1$$

it can be further modified as $$\alpha = (2^n - S)\{(2^n - S)\beta' + \gamma\} + \quad (3)$$
$$S\{(2^n - S)\beta' + \gamma\} + P_1$$
$$= (2^n - S)\{(2^n - S)(S+1)\beta' + \gamma\} + $$
$$S\gamma + P_1$$
$$= m\beta + S\gamma + P_1$$

Therefore, when I=2 is satisfied, the following equation is established $$\alpha_2 = 2^n P_1 + P_2$$
$$= (2^n - S)P_1 + SP_1 + P_2$$
$$= m\beta + \sum_{i=1}^{2} S^{2-i} P_i$$

thus satisfying Eq. (2).

If Eq. (2) is satisfied where I=K and I>2 are established, the following equation can be expressed $$\alpha_K = 2^n(2^n(2^n \ldots (2^n P_1 + P_2) \ldots) + P_1 \ldots) + P_K$$
$$= m\beta' + \sum_{i=1}^{K} S^{K-i} P_i$$

Accordingly, when I=K+1 is established, the following equation can be established $$\alpha_{K+1} = 2^n(2^n(\ldots(2^n P_1 + P_2)\ldots) + P_i \ldots) + P_{K+1}$$
$$= 2^n\left(m\beta' + \sum_{i=1}^{K} S^{K-i} P_i\right) + P_{K+1}$$

If the modification of Eq. (3) is applied, the following equation is established $$\alpha_{K+1} = m\beta + S \cdot \sum_{i=1}^{K} S^{K-i} P_i + P_{K+1}$$

$$\therefore \alpha_{K+1} = m\beta + \sum_{i=1}^{K+1} S^{K+1-i} P_i$$

Thus, it becomes clear that Eq. (2) is established with respect to a desired I.

If (I=4) is satisfied and also $m = 2^n - S > 0$ is satisfied, $$\alpha = 2^n(2^n(2^n P_1 + P_2) + P_3) + P_4$$
$$= 2^n(2^n((2^n - S)P_1 + SP_1 + P_2) + P_3) + P_4$$
$$= 2^n((2^n - S)((2^n - S)P_1 + SP_1 + P_2) +$$
$$S((2^n - S)P_1 + SP_1 P_2) + P_3) P_4$$
$$= 2^n((2^n - S)(2^n - S)(S+1) P_1 + SP_1 + P_2) +$$
$$S^2 P_1 + SP_2 + P_3) + P_4$$
$$= (2^n - S)((2^n - S)\beta'' + S^2 P_1 + SP_2 + P_3) +$$
$$S(S^2 P_1 + SP_2 + P_3) + P_4$$
$$= (2^n - S)\beta + S^3 P_1 + S^2 P_2 SP_3 + P_4$$

can be established.

In other words, when the surplus resulting from dividing α by m is obtained, it is sufficient to pay attention to only the second term $$\sum_{i=1}^{I} S^{I-i} P_i$$

of Eq. (2). Hence, it is sufficient only to calculate surplus which is obtained by dividing the second term by m.

Accordingly, if $$\sum_{i=1}^{I} S^{I-i} P_i > m$$

is established.

$$\alpha' = \sum_{i=1}^{I} S^{I-i} P_i = 2^n(2^n(2^n P_1' + P_2') +$$
$$\ldots)P_1') + \ldots) + P' I'$$

is obtained. Thus, Eq. (2) can also be applied again as follows.

$$\therefore \alpha' = m\beta_1 + \sum_{i=1}^{I'} S^{I'-i} P_i' \quad (4)$$

$$\therefore \alpha = m\beta + m\beta_1 + \sum_{i=1}^{I'} S^{I'-1} P_i'$$

Further, if third term of Eq. (4) is larger than m, this is modified and the similar operation is repeated, surplus q is finally obtained as $$\alpha = m\beta + m\beta_1 + m\beta_2 + \ldots + m\beta_l + q \quad (5)$$

When (S = 1), Eq. (2) becomes as $$\alpha = m\beta + \sum_{i=1}^{I} P_i$$

Accordingly, surplus can be obtained with ease by only the adding process of $$\sum_{i=1}^{i} P_i.$$

If $\alpha=10110101101 (=1453)$ is given as the number to be dividend and $n=3$, $S=1$, $m=7=2^3-1$ and $I=4$ are established, $$P_1 = 010, P_2 = 110, P_3 = 101, P_4 = 101$$

$$\sum_{i=1}^{4} P_i = (010) + (110) + (101) + (101)$$
$$= (10010)$$

Further, if $\alpha'=010010$ is put, the following equations are established $$P_1' = 010, P_2' = 010$$

$$\sum_{i=1}^{2} P_i' = (010) + (010) = (100)(=4)$$

In practice, when 1453 is divided by 7, quotient becomes 207 and surplus becomes 4. Thus, in the case of ($S=1$), it is possible to obtain surplus by repeatedly carrying out the addition on the binary number having n digits so as thereby to become smaller than divisor m.

Now, other embodiment of this invention based on the above principle will be described with reference to the drawings.

Figure 12:
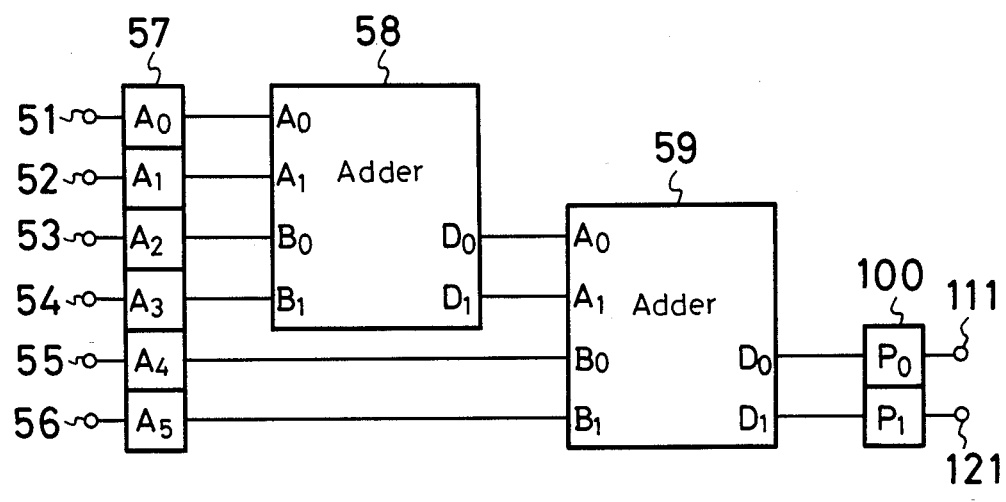
FIG. 12 is a block diagram of an embodiment of a surplus calculating circuit according to the present invention which can be employed in the apparatus shown in FIG. 8.

FIG. 12 is a block diagram showing other embodiment of the present invention. FIG. 12 illustrates a surplus calculating circuit in which $(m=3)$, $(n=2)$ and $(I=3)$ are established and 6-bit parallel data showing values from 0 to 63 is divided by 3.

If the surplus calculating operation is expressed by m ( ), the following equation can be clearly expressed m $(\Sigma P_i)=$ m $(P_1+P_2+P_3)=$ m $(P_1+P_2)\oplus$ m $(P_3)$ where $\oplus$ is the addition of (mod. 3). Accordingly, if the term of m $(P_1+P_2)$ and the term of m $(P_3)$ are separately calculated and the addition of (mod. 3) is calculated, the surplus can be obtained. As shown in FIG. 12, two (mod. 3) adders 58 and 59 constitute the surplu calculating circuit of the invention.

In FIG. 12, reference numerals 51 to 56 designate input terminals, respectively. The LSB (least significant bit) of the 6-bit parallel data is supplied to the input terminal 51 and the MSB (most significant bit) thereof is supplied to the input terminal 56. There is provided a latch circuit 57 which is adapted to latch data $A_0$ to $A_5$ delivered from the input terminals 51 to 56. The data $A_0$ to $A_3$ are respectively supplied to input terminals $A_0$, $A_1$, $B_0$ and $B_1$ of an adder 58, whereas the data $A_4$ and $A_5$ in the latch circuit 57 are respectively supplied to input terminals $B_0$ and $B_1$ of an adder 59.

In the adder 58, the addition with respect to $P=(A_0, A_1)$ and $P=(A_2, A_3)$ are performed and then a surplus is calculated. Then, 2-bit data indicative of the surplus are generated from output terminals $D_0$ and $D_1$ thereof, respectively. The outputs from the adder 58 are supplied to input terminals $A_0$ and $A_1$ of the adder 59.

In the adder 59, the addition concerning $P=(A_4, A_5)$ and (mod. 3) addition with respect to the outputs from the adder 58 are carried out to thereby calculate surplus which is the final result. As a result, 2-bit data indicative of the surplus are generated from the output terminals $D_0$ and $D_1$ of the adder 59. The outputs from the adder 59 are supplied to a latch circuit 100 and data of lower bit indicated by $P_0$ in the latch 100 is delivered to an output terminal 111. At the same time, data of higher bit indicated by $P_1$ of the latch circuit 100 is delivered to an output terminal 121. Thus, any one of the surplus calculated results of (00), (01) and (10) is obtained at the output terminals 111 and 121.

Figure 13:
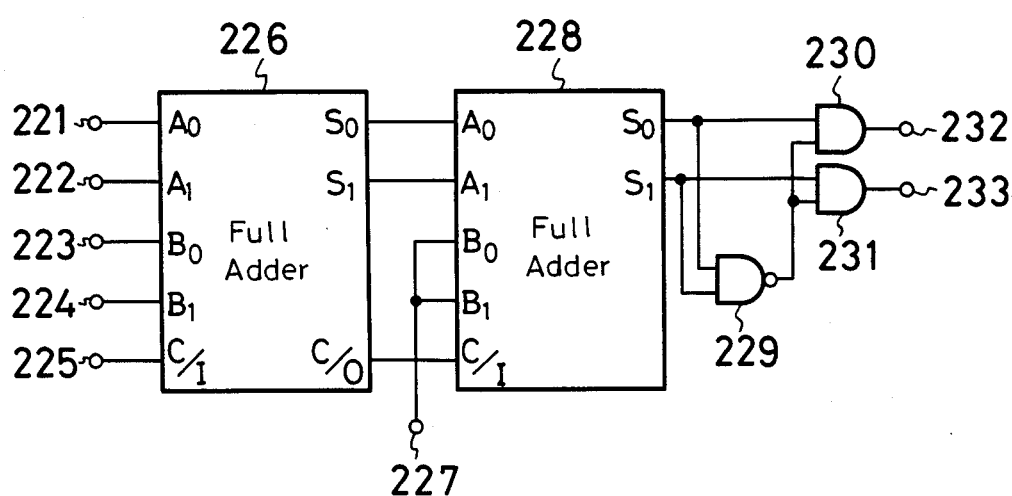
FIG. 13 is a block diagram showing an arrangement of the adder used in FIG. 12.

FIG. 13 illustrates a practical arrangement of the adders 58 and 59 used in the embodiment of FIG. 12. The adders 58 and 59 are both constructed in the same way. Referring to FIG. 13, each of the adders 58 and 59 is formed of two full adders 226 and 228 of the same arrangement, two AND circuits 230 and 231 and a NAND circuit 229.

In FIG. 13, reference numerals 221 to 225 and reference numeral 227 designate input terminals and data are supplied respectively to the input terminals 221 to 225. The signal level at the input terminals 221 and 225 are selected to be low. In the full adder 226, the addition is carried out and a sum output $S_0$ of data $A_0$ and $B_0$ is supplied to the input terminal $A_0$ of the full adder 228. At the same time, a sum output $S_1$ of data $A_1$ and $B_1$ is supplied to the input terminal $A_1$ of the full adder 228, whereas the carry output from the full adder 226 is supplied to the carry input terminal C/I of the full adder 228.

When the full adder 226 produces a carry output, the full adder 228 adds one bit to data $A_0$ (lower bit) whereas when the full adder 228 produces no carry output, the output from the full adder 226 is delivered as it is through the full adder 228. The sum output $S_0$ from the full adder 228 is supplied to first input terminals of the AND circuit 230 and the NAND circuit 229. Also, the sum output $S_1$ from the full adder 228 is supplied to a first input terminal of the AND circuit 230 and a second input terminal of the NAND circuit 229. The output from the NAND circuit 229 is supplied to second input terminals of the AND circuits 230 and 231.

When the output from the full adder 228 is any one of (00), (01) and (10), irrespective of the output from the NAND circuit 229, the sum output $S_0$ is delivered through the AND circuit 230 and the sum output $S_1$ is delivered through the AND circuit 231. When the input terminals of the NAND circuit 229 are both made high in level, or the outputs from the full adder 228 are (11), the second input terminals of the AND circuits 230 and 231 are both made low in level and the outputs from the AND circuits 230 and 231 are both made low in level. In other words, when the outputs from the full adder 228 are (11), the surplus is 0 in practice, so that the surplus calculated result is forced to be made (00).

A terminal 232 is led out from the output terminal of the AND circuit 230 and data of lower bit indicative of the surplus calculated result is obtained from the terminal 232. Whereas, a terminal 233 is led out from the output terminal of the AND circuit 231 and data of higher bit indicative of the surplus calculated result is obtained from the terminal 233.

FIG. 14 schematically illustrates a further embodiment of the surplus calculating circuit according to this invention, in which $(m=3)$, $(n=1)$ and $(S=-1)$ are established and surplus of serial data divided by 3 is obtained.

If $(S=-1)$ is substituted into the afore-mentioned Eq. (2), the following equation is established.

$$\alpha=m\beta+\Sigma(-1)^{I-i}P_i$$

When $(m=3)$, $(n=1)$ and $(S=-1)$ are established, Pi becomes one bit. For this reason, the surplus calculating circuit is formed of an up/down counter 245 having a predetermined sequence and an AND circuit 244 as shown in FIG. 14.

To the up and down control terminal of the counter 245, there is supplied from a terminal 243 a control signal (see FIG. 15B) which results from dividing a clock signal, for example, shown in FIG. 15A by 2. The up/down counter 245 is controlled by this control signal so as to carry out up-count operation when the control signal is low in level while to carry out the down-count operation when it is high in level.

The up/down counter 245 is the 2-bit counter and is so arranged that it repeats a sequence with the order of (00), (01), (10) and (00) when it is placed in the up-count operation mode while it repeats a sequence with the order of (00), (10), (01) and (00) when it is placed in the down-count operation mode.

The AND circuit 244 receives at its first input terminal 241 serial data shown in FIG. 15C and receives at its second input terminal 242 a clock signal shown in FIG. 15A. Therefore, only when the serial data (shown in FIG. 15C) and the clock signal (shown in FIG. 15A) are both high in level, the output from the AND circuit 244 becomes high in level. When the output from the AND circuit 244 becomes high in level, the clock input terminal CLK of the up/down counter 245 becomes high in level. Thus, the up/down counter 245 counts the leading edge of the output from the AND circuit 244 at a predetermined operation in response to the level of the timing control signal.

In the case shown in FIG. 15, as the serial data changes in the order of 1, 1, 0, 1, 0, 1, 0, 1, 1, 0, the up/down counter 245 generates at its output terminal $Q_0$ an output with the order of 0, 0, 0, 1, 1, 0, 0, 0, 0, 0 at timing corresponding to the leading edge of the clock signal and also generates at its output terminal $Q_1$ an output with the order of 1, 0, 0, 0, 0, 1, 1, 0, 1, 1 at timing corresponding to the leading edge of the clock signal.

Terminals 246 and 247 are respectively led out from the output terminals $Q_0$ and $Q_1$ of the counter 245, wherein data of lower bit of the surplus calculated result is obtained at the terminal 246 and data of higher bit of the surplus calculated result is obtained at the terminal 247. In the case of FIG. 15, in regard to the input data of (1101010110) (=854), (10) (=2) is obtained as the surplus calculated result and this becomes coincident with the quotient, 284 and surplus, 2 which results from the practical division.

While the present invention is applied to the case of (S=1) and to other case of (S=−1), it is needless to say that this invention can also be applied to a case of (S≠±1), similarly.

According to the present invention, as set forth above, the present invention utilizes the fact that if the divisor m is selected to be $m=2^n-S$ and $S=1$ is satisfied, the following relationship is established between the number α to be dividend α and the divisor m as $$\alpha = m\beta + \sum_{i=1}^{l} P_i$$

Thus, the surplus can be easily calculated by only the adding process. Therefore, according to the present invention, unlike the conventional surplus calculating circuit, the surplus can be obtained without the practical division so that the scale of hardware can be miniaturized and that the calculated result can be obtained in a short period of time.

The above description is given on the preferred embodiments of the invention but it will be apparent that many modifications and variations could be effected by one skilled in the art without departing from the spirits or scope of the novel concepts of the invention so that the scope of the invention should be determined by the appended claims only.

We claim as our invention:

1. An apparatus for encoding time code comprising:
   time code signal input terminal means for receiving a first time code signal including first time code data having a first synchronizing signal and time code series and comprised of a plurality of bits;
   time code decoding means for decoding said first time code signal and generating second time code data;
   synchronizing signal input terminal means for receiving a second synchronizing signal;
   bit number data generating means for generating bit number data corresponding to the number of said plurality of bits of said first time code data in response to said second synchronizing signal; and
   time code data output terminal means for deriving a second time code signal comprising said second time code data and said bit number data.

2. An apparatus according to claim 1, wherein said time code decoding means generates a reset signal corresponding to said first synchronizing signal and a first clock signal corresponding to a bit period of bits of said first time code data, said bit number generating means comprises counter means reset in response to said reset signal from said time code decoding means and for counting said first clock signal corresponding to the number of plurality of bits of said first time code data and latch means connected to receive said second synchronizing signal and for latching a content of said counter means in response to said second synchronizing signal so as to generate bit number data and said time code data output terminal means comprises a first output terminal for deriving said time code data and a second output terminal for deriving said bit number data.

3. An apparatus according to claim 1, wherein said first time code data consists of a frame code, a second code, a minute code and an hour code.

4. An apparatus according to claim 3, wherein said first time code data are an SMPTE time code.

5. An apparatus for recording digital data including time code comprising:
   time code signal input terminal means for receiving a first time code signal including first time code data having a first synchronizing signal and time code series and comprised of a plurality of bits;
   time code decoding means for decoding said first time code signal and generating second time code data;
   synchronizing signal input terminal means for receiving a second synchronizing signal;
   bit number data generating means for generating bit number data corresponding to the number of said plurality of bits of said first time code data in response to said second synchronizing signal; and
   means for recording said digital data including said second time code data and said bit number data to a recording medium in synchronism with said second synchronizing signal.

6. An apparatus according to claim 5, wherein said time code decoding means generates a reset signal corresponding to said first synchronizing signal and a first clock signal corresponding to a bit period of bits of said first time code data, and said bit number generating means comprises counter means reset in response to said reset signal from said time code decoding means and for counting said first clock signal corresponding to the number of said plurality of bits of said first time code data and latch means connected to receive said second synchronizing signal and for latching a content of said counter means in response to said second synchronizing signal so as to generate said bit number data.

7. An apparatus according to claim 5, wherein said first time code data consists of a frame code, a second code, a minute code and an hour code.

8. An apparatus according to claim 7, wherein said first time code data are an SMPTE time code.

9. An apparatus for encoding time code comprising:
synchronizing signal input terminal means for receiving a first synchronizing signal;
time code data input terminal means for receiving said time code data;
bit number data input terminal means for receiving said bit number data;
bit clock input terminal means for receiving a bit clock signal corresponding to a bit period of bits of a time code of a first time code signal including first time code data having a second synchronizing signal and time code series and comprised of a pluralityof bits;
said counter means loaded with said bit number data in response to said second synchronizing signal and for counting said second bit clock signal until a carry signal is generated;
time code encoding means connected to receive said time code data and for generating said first kind of time code series in response to said carry signal from said counter means; and
time code signal output terminal means for deriving a first time code signal including first time code data having a second synchronizing signal and time code series and comprised of a plurality of bits.

10. An apparatus for reproducing digital data including time code comprising:
synchronizing signal input terminal means for receiving a first synchronizing signal;
means for reproducing said digital data including time code data and bit number data from a recording medium in synchronism with said first synchronizing signal;
bit clock input terminal means for receiving a bit clock signal corresponding to a bit period of bits of a time code of a first time code signal including first time code data having a second synchronizing signal and time code series and comprised of a plurality of bits;
said counter means loaded with said bit number data in response to said second synchronizing signal and for counting said second bit clock signal until a carry signal is generated;
time code encoding means connected to receive said time code data and for generating said first kind of time code series in response to said carry signal from said counter means; and
time code signal output terminal means for deriving a first time code signal including first time code data having a second synchronizing signal and time code series and comprised of a plurality of bits.

11. An apparatus for recording and/or reproducing digital data including time code comprising:
time code signal input terminal means for receiving a first kind of time code signal including a time code synchronizing signal and a first kind of time code series each code having a plurality of bits;
time code decoding means for decoding each of said time code of said first kind of time code series and generating a control signal corresponding to said time code synchronizing signal, time code data, and a first clock signal corresponding to a bit period of bits of said time code;
time code data output terminal means for deriving said time code data;
counter means reset in response to said control signal from said time code decoding means and for counting said first clock signal corresponding to the number of said plurality of bits;
synchronizing signal input terminal means for receiving a second synchronizing signal;
latch means connected to receive said second synchronizing signal and for latching a content of said counter means in response to said second synchronizing signal so as to generate bit number data;
bit number data output terminal means for deriving said bit number data;
means for recording and/or reproducing said digital data including said time code data and bit number data to and/or from a recording medium in synchronism with said second synchronizing signal;
time code data input terminal means for receiving said time code data;
bit number data input terminal means for receiving said bit number data;
bit clock input terminal means for receiving a second bit clock signal;
said counter means loaded with said bit number data in response to said second synchronizing signal and for counting said second bit clock signal until a carry signal is generated;
time code generating means connected to receive said time code data and for generating said first kind of time code series in response to said carry signal from said counter means; and
time code signal output terminal means for deriving said first kind of time code series.

* * * * *